United States Patent
Conway, Jr.

(10) Patent No.: US 10,625,757 B2
(45) Date of Patent: Apr. 21, 2020

(54) BACKING RING FOR RAILCAR AXLE

(71) Applicant: Ranger Bearings LLC, Memphis, TN (US)

(72) Inventor: Daniel T. Conway, Jr., Matthews, NC (US)

(73) Assignee: Ranger Bearings LLC, Memphis, TN (US)

( * ) Notice: Subject to any disclaimer, the term of this patent is extended or adjusted under 35 U.S.C. 154(b) by 0 days.

(21) Appl. No.: 16/411,278

(22) Filed: May 14, 2019

(65) Prior Publication Data

US 2019/0329799 A1    Oct. 31, 2019

Related U.S. Application Data

(62) Division of application No. 14/878,052, filed on Oct. 8, 2015, now abandoned.

(60) Provisional application No. 62/061,411, filed on Oct. 8, 2014.

(51) Int. Cl.
*B61F 15/22* (2006.01)
*F16C 35/06* (2006.01)
*F16C 33/76* (2006.01)
*F16C 35/063* (2006.01)

(52) U.S. Cl.
CPC ............ *B61F 15/22* (2013.01); *F16C 33/768* (2013.01); *F16C 35/063* (2013.01); *F16C 2326/10* (2013.01)

(58) Field of Classification Search
CPC .. F16C 35/063; F16C 19/386; F16C 2326/10; B61F 15/22
See application file for complete search history.

(56) References Cited

U.S. PATENT DOCUMENTS

| | | | |
|---|---|---|---|
| 7,219,938 B2 | 5/2007 | Brister et al. | |
| 8,226,299 B2 * | 7/2012 | Hubbard | F16C 35/063 384/564 |
| 8,696,212 B2 | 4/2014 | Hubbard et al. | |
| 9,016,950 B2 | 4/2015 | Buchanan et al. | |
| 2008/0085069 A1 | 4/2008 | Toth et al. | |
| 2012/0195540 A1 | 8/2012 | Hubbard et al. | |

* cited by examiner

*Primary Examiner* — Alan B Waits
(74) *Attorney, Agent, or Firm* — Banner & Witcoff, Ltd.

(57) ABSTRACT

A backing ring assembly for a railcar axle is provided. According to various aspects, the backing ring assembly may include a main body and a ring. The main body may include an inner surface configured to abut a fillet of a railcar axle and a receiving element on an inboard radial face of the main body. The ring may be engaged in the receiving element and may be configured to protrude over a cylindrical surface of a shoulder on the railcar axle. The ring may include an inner face having a recess and a generally flat outer face.

15 Claims, 10 Drawing Sheets

BACKING RING FOR RAILCAR AXLE

RELATED APPLICATION DATA

This application is a divisional of U.S. patent application Ser. No. 14/878,052, filed Oct. 8, 2015, which claims the benefit of priority to U.S. Provisional Patent Application No. 62/061,411, filed Oct. 8, 2014, the disclosures of which are herein incorporated by reference in their entirety.

FIELD OF THE DISCLOSURE

Aspects generally relate to a roller bearing assembly. More particularly, aspects generally relate to a two-part backing ring used to back a roller bearing on a railcar axle.

BACKGROUND

Two-part backing rings used to back a roller bearing assembly on a railcar axle are known in the art. In such two-part backing rings, a main body abuts and thus backs (i.e., prevents inboard movement of) a roller bearing assembly used on the railcar axle, and a second piece or locking ring engages both the main body and a railcar axle in an effort to maintain the main body securely in place.

For example, U.S. Pat. No. 7,219,938 describes a two-part backing ring including an annular body (first part) which abuts a fillet of a journal of a railcar axle and which includes a lip extending over the outer cylindrical diameter of a dust guard of the railcar axle, and a stabilizing element (second part) lodged tightly between the lip and dust guard to lessen motion between the lip and the cylindrical surface. However, such a design provides drawbacks because, among other deficiencies, the lip is susceptible to failure (e.g., shearing off) during use as the railcar axle moves with respect to the main body of the backing ring.

Other known two-part backing rings eliminate this lip. For example, U.S. Pat. No. 8,226,299 describes a two-part backing ring including an annular body (first part) which abuts the fillet of the journal of the railcar axle but which does not include a lip extending over the outer cylindrical diameter of the dust guard of the railcar axle. Rather, the annular body includes a slot on an inboard face of the annular body which receives a locking ring (second part), and this locking ring extends out from the slot and over the dust guard. However, this design also includes drawbacks because, among other deficiencies, the locking ring includes an outer and an inner groove, providing a weak middle portion of the ring.

SUMMARY

This Summary is provided to introduce a selection of concepts in a simplified form that is further described below in the Detailed Description. This Summary is not intended to identify key features or essential features of the invention.

Aspects of the disclosure are directed to a two-part backing ring which overcomes one or more of the drawbacks associated with the known backing rings discussed above. For example, some embodiments of the disclosure are directed to a two-part backing ring which exhibits improved durability and backing performance as compared to known two-part backing rings.

According to aspects of the disclosure, a backing ring assembly for a railcar axle is provided. The backing ring assembly may include a main body and a ring. The main body may include an inner surface configured to abut a fillet of the railcar axle and a receiving element on an inboard radial face of the main body. The ring may be engaged in the receiving element and may be configured to protrude over a cylindrical surface of a shoulder on the railcar axle. The ring may include an inner face having a recess and a generally flat outer face.

In another embodiment, a railcar axle assembly in provided. The railcar axle assembly may include a roller bearing assembly and a backing ring assembly. The roller bearing assembly may include a journal having a fillet on an outer surface and a shoulder inboard of the journal. The shoulder may include an outer cylindrical surface, and the fillet may abut the cylindrical surface. The backing ring may abut the fillet of the journal, and may include a main body and an insertable ring. The main body may have an inner surface abutting the fillet of the journal and a receiving element on an inboard radial face. The insertable ring may be engaged in the receiving element and may extend over the cylindrical surface of the shoulder. The insertable ring may include an inner face having a recess and a generally flat outer face. Additional embodiments are described herein.

BRIEF DESCRIPTION OF THE DRAWINGS

A more complete understanding of the disclosure and the advantages thereof may be acquired by referring to the following description in consideration of the accompanying figures, in which like reference numerals in different figures indicate similar elements, in which the first portion of each reference numeral corresponds to the figure number in which the referenced element is first introduced, and wherein.

DETAILED DESCRIPTION

In the following description of the various embodiments, reference is made to the accompanying drawings, which form a part hereof, and which are shown by way of illustration. It is to be understood that other embodiments may be utilized and structural and functional modifications may be made without departing from the scope of the disclosure. For example, each of the features identified in FIGS. 1-19 may be utilized on other embodiments in any combination or subcombination.

In the following figures, portions of the backing ring may not necessarily be shown to scale. In particular, elements of the main body and the ring may be larger or smaller than elements shown in the following figures, without departing from the scope of the present disclosure.

Figure 1:
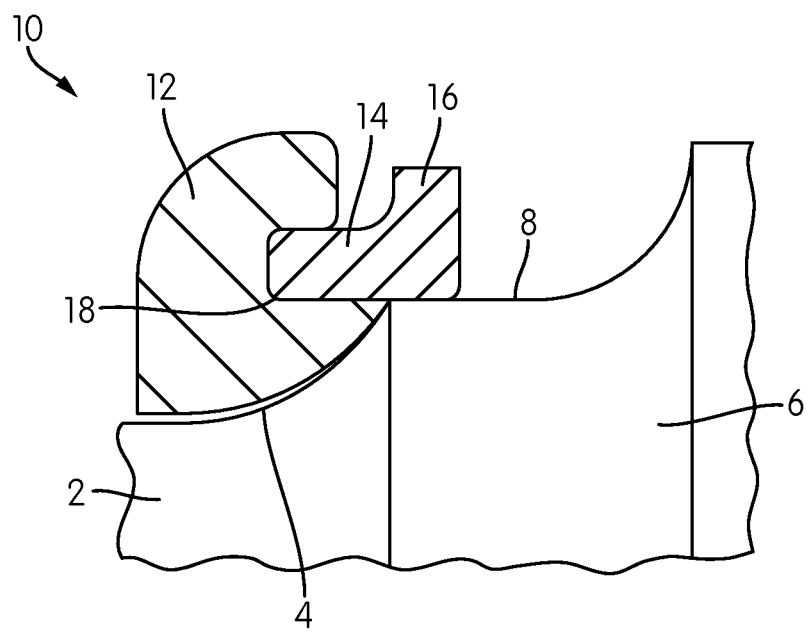
FIG. 1 is a sectional view of a backing ring according to an embodiment of the present disclosure.

FIG. 1 depicts an embodiment of an improved two-part backing ring 10. The backing ring 10 includes an annular body or main body 12 and a replacement part or ring 14 which engages with the main body 12. When installed on a railcar axle journal 2, the main body 12 abuts a fillet 4 which itself abuts cylindrical surface 8 of a dust guard or shoulder 6 on the railcar axle journal 2 which, accordingly, prevents inboard movement of the main body 12 (and thus a bearing assembly, not shown, which abuts an outboard side of the backing ring 10).

The main body 12 may be variously configured. In one embodiment, main body 12 may include a slot or receiving element 18 provided on an inboard radial face of the main body 12 for receiving ring 14. For example, the receiving element 18 may be a slot (e.g., an annular slot) in the edge of main body 12 cooperating with ring 14 inserted into the slot. The receiving element 18 may also be variously configured as, for example, a series of holes disposed around main body 12 cooperating with pins disposed on insertable ring 14. Alternatively, main body 12 may be configured such that ring 14 is pressed over main body 12. For example, main body 12 may be coplanar with cylindrical surface 8 such that ring 14 is simply pressed over a top portion of main body 12.

The main body 12 may include dimples and/or depressions cooperating with dimples and/or depressions on ring 14 to keep it in place. In one exemplary embodiment, depicted in FIG. 1, the receiving element 18 (e.g., slot) of the main body 12 receives ring 14, e.g., in an interference fit, when the backing ring 10 is installed on the railcar axle. That is, an outboard end of the insertable ring 14 engages with the receiving element 18 of the main body 12, and an inboard end of the insertable ring 14 engages with an outer cylindrical surface 8 (i.e., shoulder) of the railcar axle, e.g., in an interference fit, when the ring 14 is mounted to the railcar axle. As shown in FIG. 1, an overhang formed above the receiving element 18 of the main body 12 is disposed above the fillet 4 of the railcar axle and does not extend over the shoulder 6 of the railcar axle.

In the embodiment depicted in FIG. 1, the ring 14 includes a radially extending portion, i.e. a flange 16 provided on an end (e.g., the inboard end) of the ring 14. In various embodiments, the flange 16 may extend radially outward, radially inward, may be a series of holes, a series of nubs, cylindrical portions, bolts, flanges, teeth, and/or other arrangement. Preferably, the flange 16 is configured to make the ring 14 more easily removable. The flange 16 may include a curvature to make the flange more rigid and to prevent the flange from bending. The flange 16 may be gripped by, e.g., an insertion and/or removal tool to assist in installing and/or removing the ring 14 to the railcar axle.

In embodiments where the flange 16 includes a series of toothed portions, the insertion and/or removal tool may have teeth and/or slots for receiving the toothed portions. The tool may then slide over ring 14a between the teeth of flange 16, rotate, and then be used to install and/or remove ring 14a. In embodiments where the ring 14 includes a hole or slot, the hole or slot may be engaged by an insertion and/or removal tool (instead of or in addition to the flange 16) during installation and/or removal of the insertable ring 14.

Figure 2:
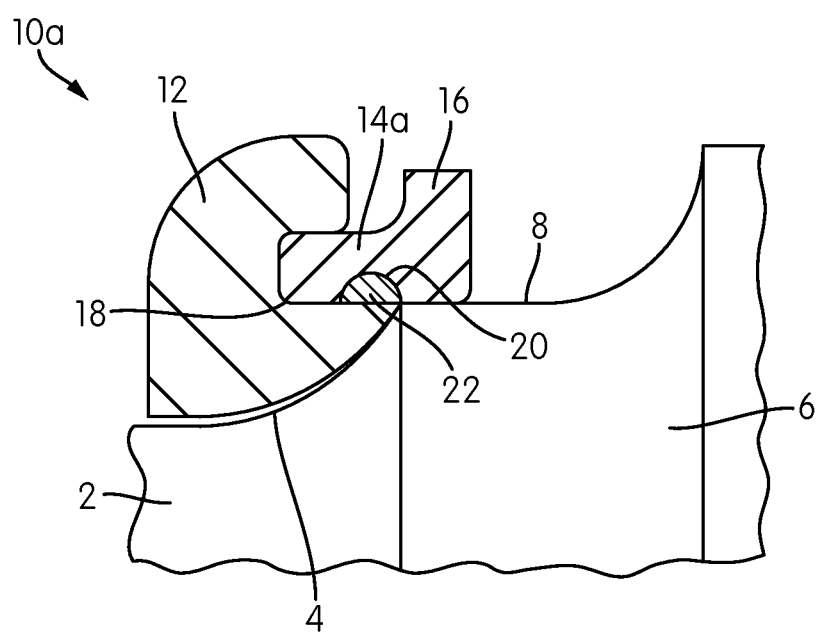
FIGS. 2-19 are sectional views of backing rings according to other embodiments of the present disclosure.

FIG. 2 depicts another embodiment of a two-part backing ring 10a according to aspects of the disclosure. The backing ring 10a depicted in FIG. 2 is similar to the backing ring 10 depicted in FIG. 1, but in the embodiment of FIG. 2, an insertable ring 14a of the backing ring 10a includes a groove 20 provided on an inner face of the insertable ring 14a. Further, a seal 22 may be mounted in the groove 20 and abut the outer cylindrical surface 8 and/or a bottom face of the slot 18. In such an embodiment, the seal 22 may help prevent water and other debris from entering the bearing assembly during use. In some embodiments, the backing ring 14a may include the groove 20 without anything (e.g., seal 22 or otherwise) mounted therein.

Figure 3:
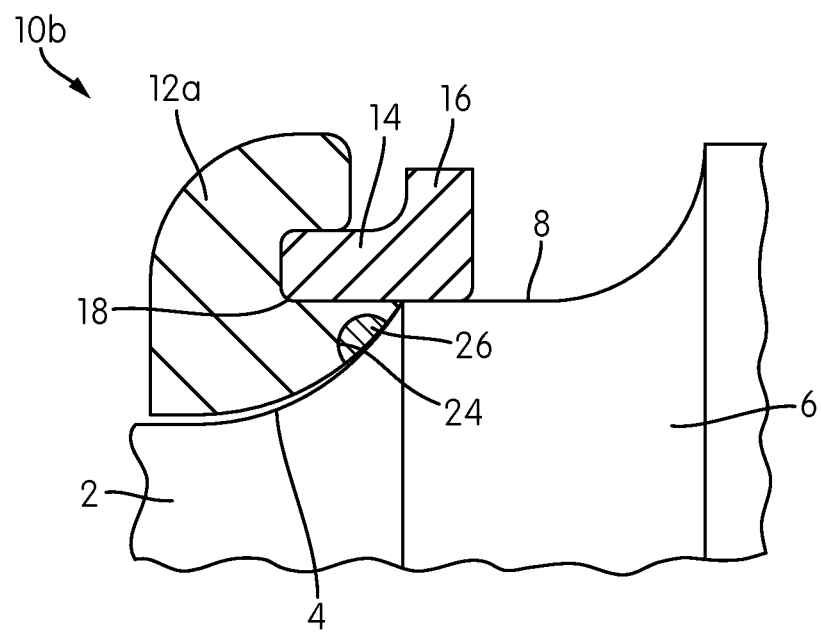

FIG. 3 depicts yet another embodiment of a two-part backing ring 10b according to aspects of the disclosure. The backing ring 10b depicted in FIG. 3 is similar to the backing ring 10 depicted in FIG. 1, but in this embodiment a main body 12a of the backing ring 10b includes a groove 24 on a face of the main body 12a which abuts the fillet 4 of the railcar axle. Further, a seal 26 is mounted in the groove 22 and abuts the fillet 4. In such an embodiment, the seal 26 may help prevent water and other debris from entering the bearing assembly during use.

Figure 4:
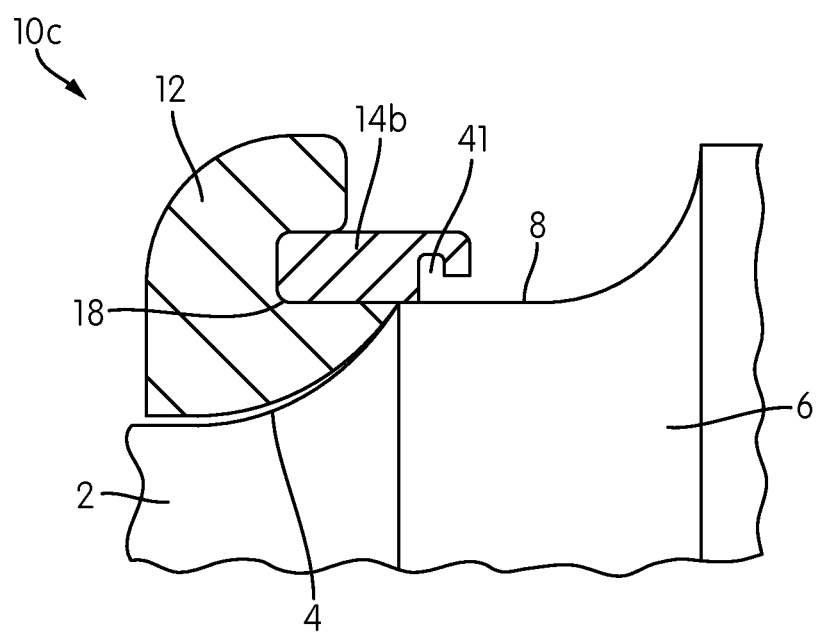

FIG. 4 depicts yet another embodiment of a two-part backing ring 10c according to aspects of the disclosure. The backing ring 10c depicted in FIG. 4 is similar to the backing ring 10 depicted in FIG. 1, but in this embodiment an insertable ring 14b does not include the flange 16. Rather, the insertable ring 14b is generally annular in shape such as an annular cylinder. The insertable ring 14b may or may not include an overhang portion 41 (e.g., toothed members, annular inner groove, tabs, or the like) to assist in, for example, a removal operation. Where present, the overhand portion 41 may engage with an insertion and/or removal tool.

Figure 5:
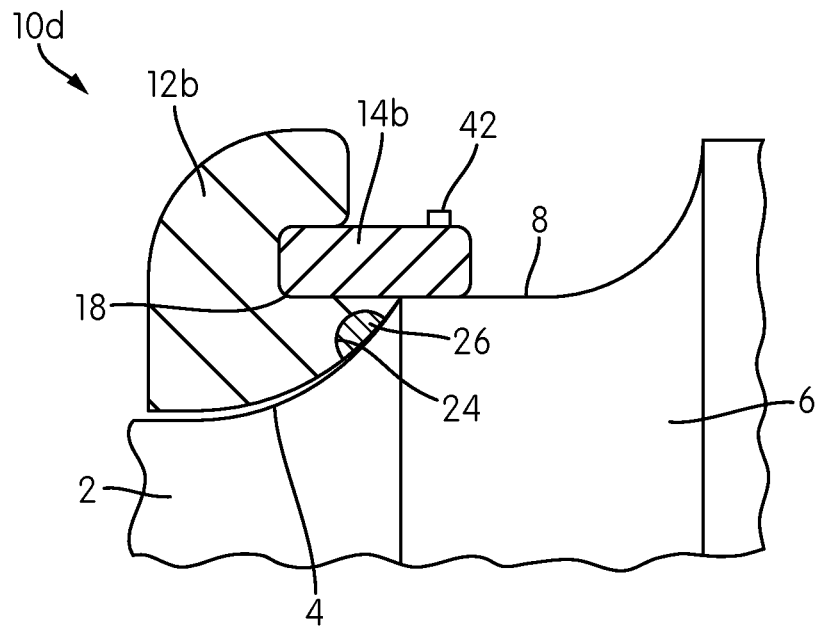

FIG. 5 depicts yet another embodiment of a two-part backing ring 10d according to aspects of the disclosure. The backing ring 10d depicted in FIG. 5 is similar to the backing ring 10c depicted in FIG. 4, but in this embodiment the main body 12b includes the groove 24 with the seal 26 mounted therein (as described in connection with FIG. 3, above). Additionally, projections 42 (e.g., cylindrical, square, star, and/or rectangular projections, annular projections such as a ring or tooth pattern, and/or depressions of various shapes and sizes) may be utilized to assist with insertion and/or removal of ring 14b.

Figure 6:
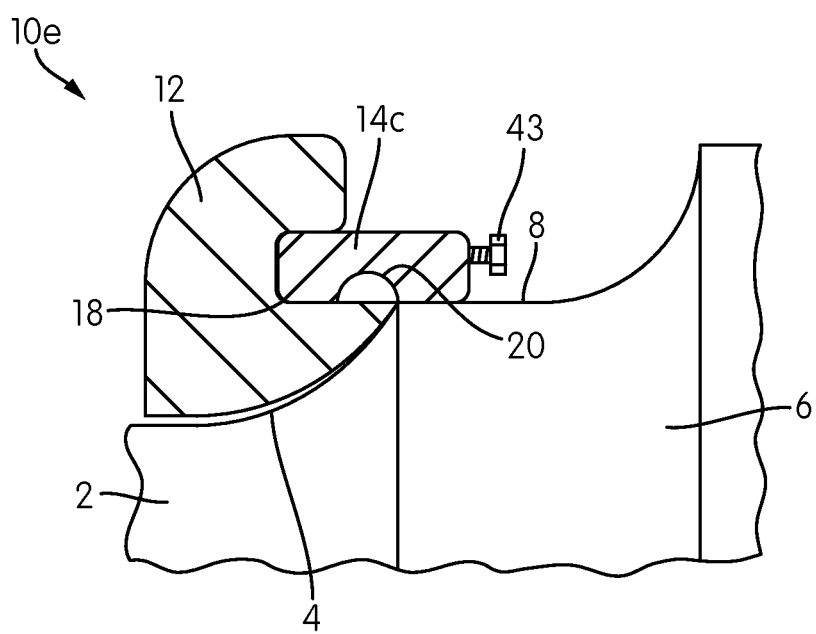

FIG. 6 depicts yet another embodiment of a two-part backing ring 10c according to aspects of the disclosure. The backing ring 10e depicted in FIG. 6 is similar to the backing ring 10c depicted in FIG. 4, but in this embodiment an insertable ring 14c includes the groove 20 (as described in connection with FIG. 2, above). Additionally, a laterally extending projection 43 (e.g., a bolt, pin, triangle, and/or other mechanical member) may project laterally and have a hold or flange to engage with an insertion and/or removal tool.

Figure 7:
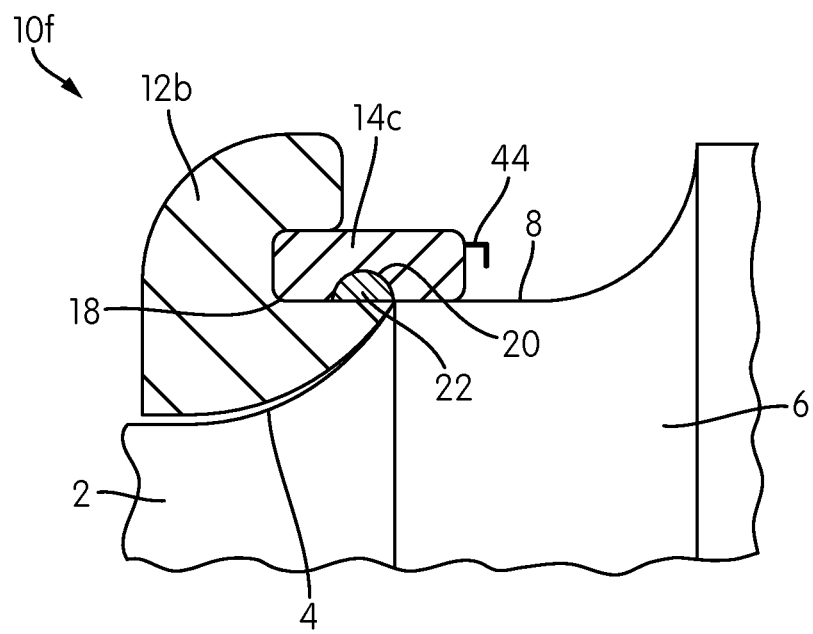

FIG. 7 depicts yet another embodiment of a two-part backing ring 10f according to aspects of the disclosure. The backing ring 10f depicted in FIG. 7 is similar to the backing ring 10c depicted in FIG. 6, but in this embodiment the seal 22 is provided in the groove 20 of the ring 14c (as described in connection with FIG. 2, above). Additionally, laterally extending member 44 may be a hook, finger, and/or annular member that is configured for engaging with an insertion and/or removal tool.

Figure 8:
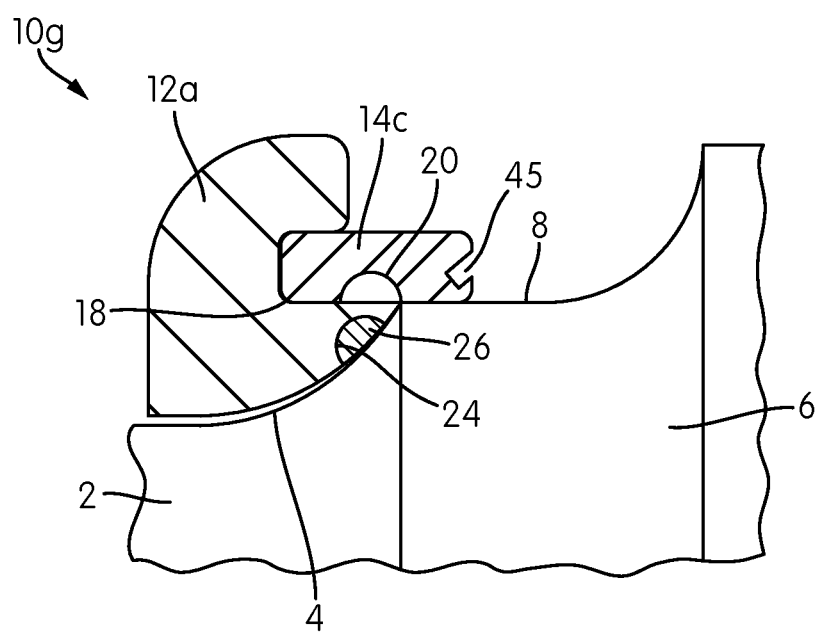

FIG. 8 depicts yet another embodiment of a two-part backing ring 10g according to aspects of the disclosure. The backing ring 10g depicted in FIG. 8 is similar to the backing ring 10e depicted in FIG. 6, but in this embodiment main body 12a includes the groove 26 and seal 24 (as described in connection with FIG. 3, above). It should be appreciated that, although not shown, in some embodiments the ring 14c may include the seal 22 in the groove 20 (similar to the embodiment shown in FIG. 7) in addition to the main body 12a including the seal 26 provided in the groove 24. Further, a laterally inwardly extending depression 45 (e.g., an angled annular grove, angular depression, angular spaced holes, and/or angular inwardly extending cylinders) may be formed in the outer surface of the ring 14c. These depressions may cooperate with an insertion and/or removal tool.

Figure 9:
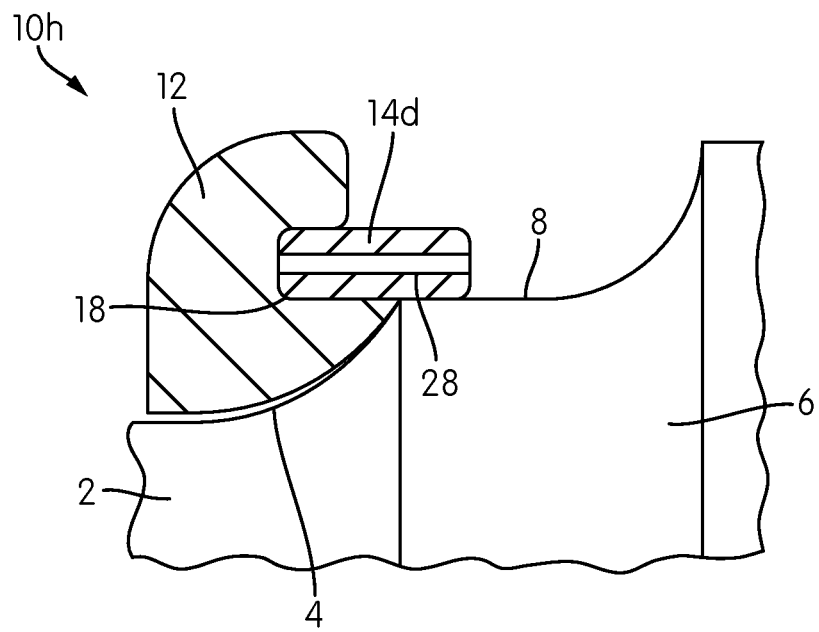

FIG. 9 depicts yet another embodiment of a two-part backing ring 10h according to aspects of the disclosure. The backing ring 10h depicted in FIG. 9 is similar to the backing ring 10c depicted in FIG. 4, but in this embodiment an insertable ring 14d includes a hole 28 extending from an inboard face of the insertable ring 14d to an outboard face of the insertable ring 14d. The hole 28 may be configured to be engageable with an insertion and/or removal tool used when mounting and/or removing the insertable ring 14*d* to the railcar axle. For example, in some embodiments the hole 28 may include threads on an inner face thereof which are engageable with threaded bolts or the like of the insertion and/or removal tool. Further, the holes 28 may include a slotted flanged portion that locks with an insertion and/or removal tool when, for example, the tool is rotated. A slot in the upper surface of ring 14 may cooperate with a pin in hole 28 so that an removal tool may press against pins (not shown) in order to remove ring 14*d*.

Figure 10:
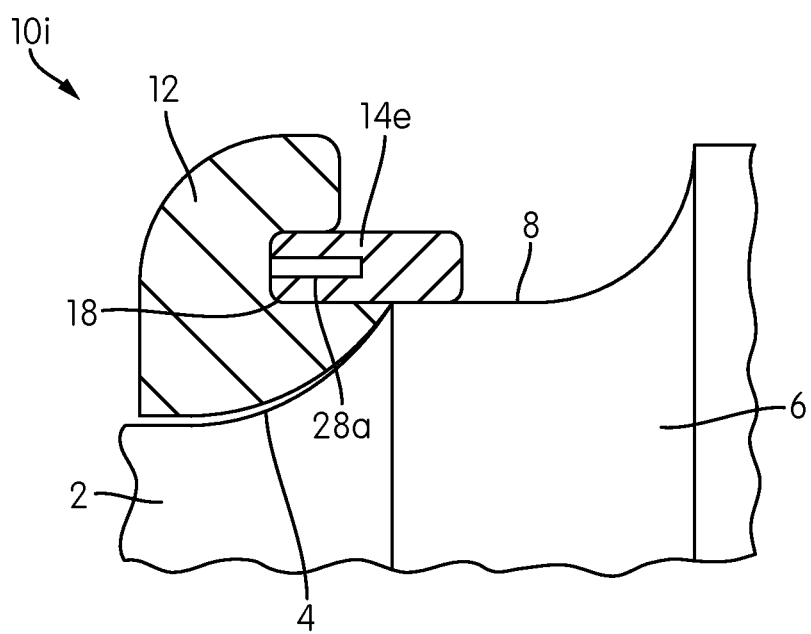

FIG. 10 depicts yet another embodiment of a two-part backing ring 10*i* according to aspects of the disclosure. The backing ring 10*i* depicted in FIG. 10 is similar to the backing ring 10*h* depicted in FIG. 9, but in this embodiment an insertable ring 14*e* includes a hole 28*a* which only extends partway into the insertable ring 14*e* from an inboard face of the insertable ring 14*e*.

Figure 11:
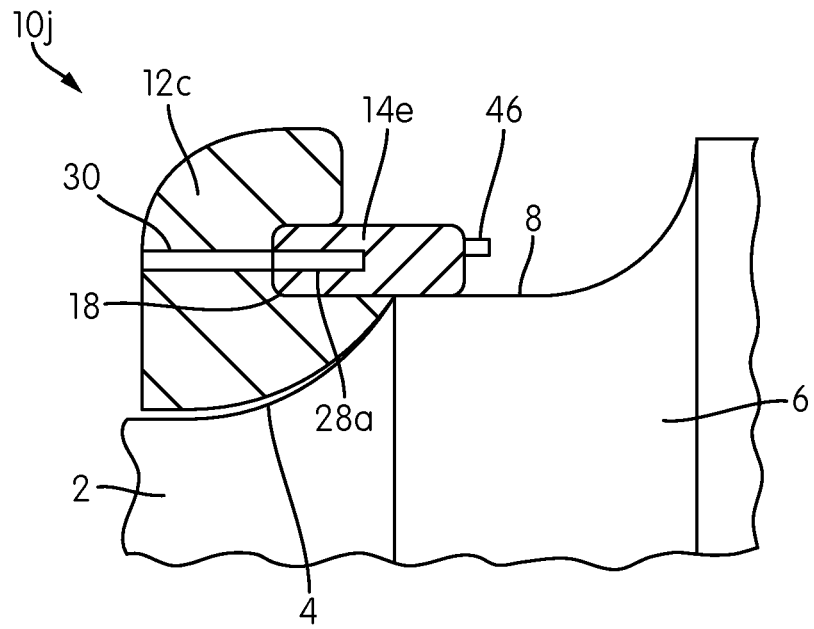

FIG. 11 depicts yet another embodiment of a two-part backing ring 10*j* according to aspects of the disclosure. The backing ring 10*j* depicted in FIG. 11 is similar to the backing ring 10*i* depicted in FIG. 10, but in this embodiment a main body 12*c* includes an access hole 30 which, when the backing ring 10*j* is mounted to the railcar axle, may be aligned with the hole 28*a* of the insertable ring 14*e*. In such embodiments, the hole 28*a* of the ring 14*e* may be formed at the same time as access hole 30 when the ring 14*e* is inserted in the main body 12*c* and/or hole 28*a* may be attached or connected to the hole 30 of main body 12*c*. Alternatively, the hole 30 may simply be in main body 12*c* and simply abut against ring 14*e*. Where the hole is accessible, the hole may cooperate with a nut, bolt, pin, and/or hydraulic fitting such that pressure may be asserted through the hole against the ring 14*e* in order to assist in removal. For example, where the hole 30 is accessible from an outboard side of the main body 12*c* by, e.g., an insertion and/or removal tool via the access hole 30 (e.g., the hole 28*a* is accessible such that the a tool can be used to press the insertable ring 14*e* away from main body 12*c*). Ring 14*e* may be configured with one or more (e.g., an annular series) of outwardly extending loops 46 (e.g., cylindrical loops, annular loops, half pipe loops, and/or other laterally extending member with a hole and/or depression). In this manner, an insertion and/or removal tool may cooperate with the holes in the extending loops 46.

Although not shown, it should be appreciated that in other suitable embodiments the rings 14 and 14*a*-14*i* may include, e.g., the groove 20 with or without the seal 22 as described in connection with FIGS. 2 and 6-8, and may be used in connection with, e.g., the main body 12*a* including the groove 24 and seal 26 as described in connection with, e.g., FIGS. 3, 5, and 8. It should be further appreciated that the insertable ring 14, and/or 14*a*-14*i* could be used in connection with the main body 12, 12*a*-12*c* of any other embodiment. For example, the main body 12*c* described in connection with FIG. 11 may further include the groove 24 and seal 26 included in the main body 12*a* of FIGS. 3, 5, and 8.

Figure 12:
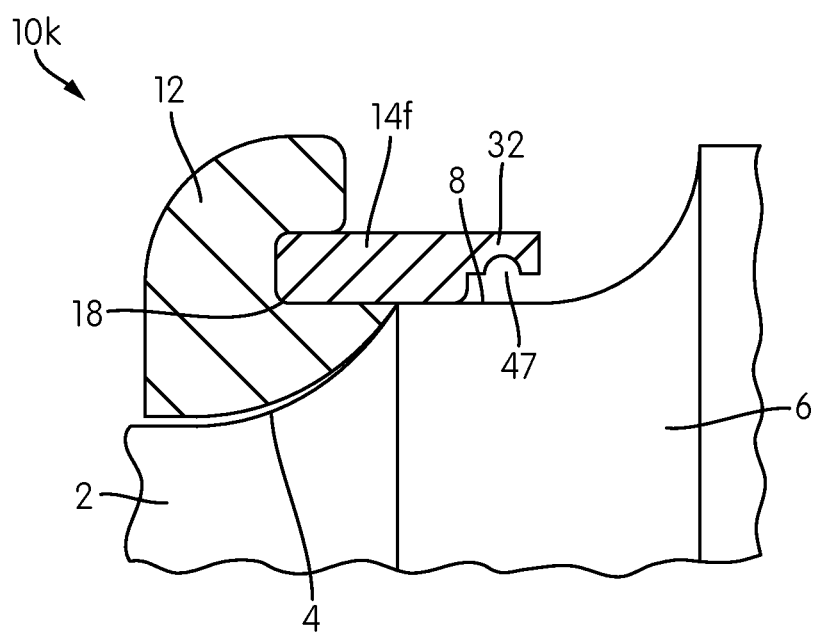

FIG. 12 depicts yet another embodiment of a two-part backing ring 10*k* according to aspects of the disclosure. The backing ring 10*k* depicted in FIG. 12 is similar to the backing ring 10*c* depicted in FIG. 4, but in this embodiment an insertable ring 14*f* includes an inwardly extending flange 32 extending from an inboard face of the insertable ring 14*f*. The flange 32 may include one or more overhangs and/or depressions 47 for cooperating with an insertion and/or removal tool. Similar to, e.g., the flange 16 discussed in connection with FIG. 1, the flange 32 of the insertable ring 14*f* may be gripped by, e.g., an insertion and/or removal tool, to assist in installing and/or removing the insertable ring 14*f* to the railcar axle.

Figure 13:
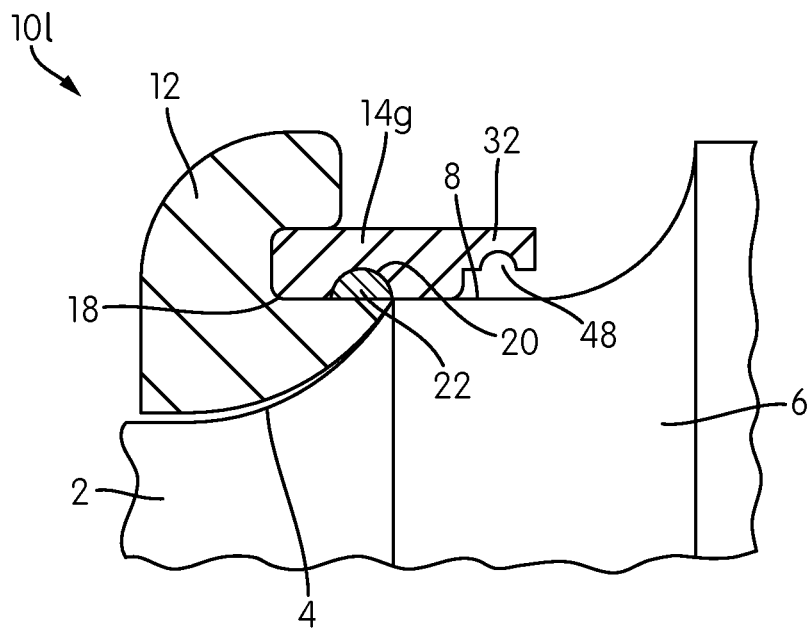

FIG. 13 depicts yet another embodiment of a two-part backing ring 10*l* according to aspects of the disclosure. The backing ring 10*l* depicted in FIG. 13 is similar to the backing ring 10*k* depicted in FIG. 12, but in this embodiment an insertable ring 14*g* includes the groove 20 and the seal 22 (as described in connection with FIG. 2, above). It should be appreciated that in other suitable embodiments the insertable ring 14*g* may include the groove 20 but omit the seal 22. The flange 32 may include one or more overhangs and/or depressions 48 for cooperating with an insertion and/or removal tool.

Figure 14:
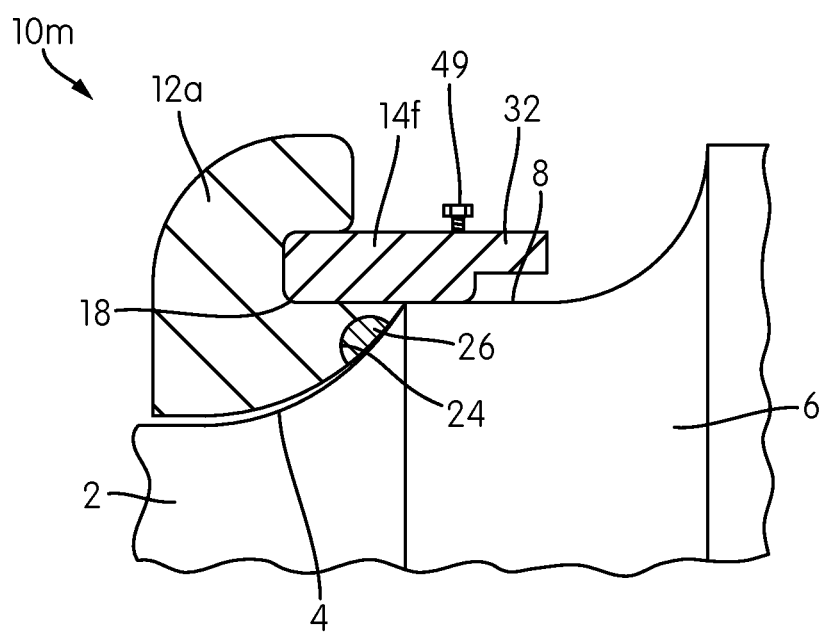

FIG. 14 depicts yet another embodiment of a two-part backing ring 10*m* according to aspects of the disclosure. The backing ring 10*m* depicted in FIG. 14 is similar to the backing ring 10*k* depicted in FIG. 12, but in this embodiment the backing ring 10*m* includes the main body 12*a* including the groove 26 and seal 24 (as described in connection with FIG. 3, above). The ring 14*f* may also include one or more radial projections 49, such as bolts or cylinders for assisting in installation and/or removal of the ring 14*f*.

Figure 15:
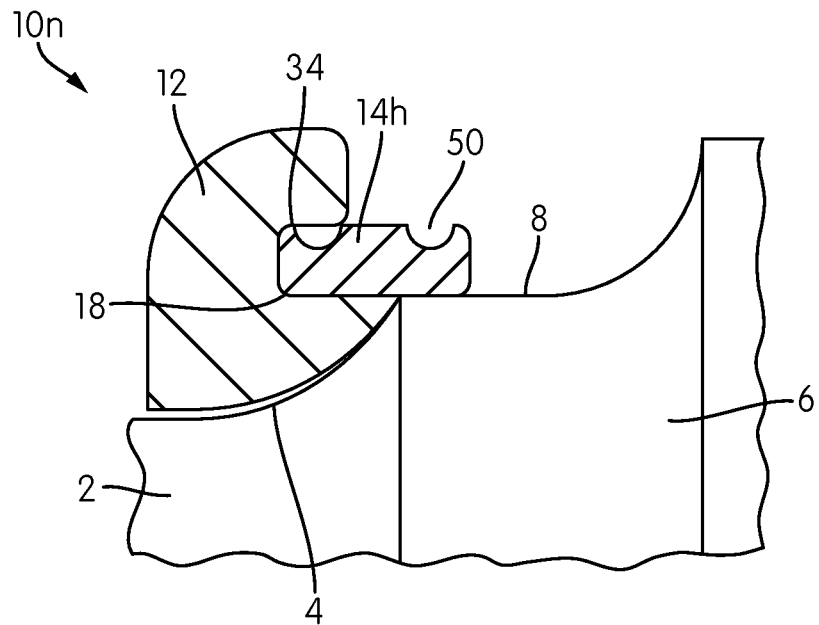

FIG. 15 depicts yet another embodiment of a two-part backing ring 10*n* according to aspects of the disclosure. The backing ring 10*n* depicted in FIG. 15 is similar to the backing ring 10*c* depicted in FIG. 4, but in this embodiment the backing ring 10*n* includes an insertable ring 14*h* having grooves 34 and 50 formed on an outer surface thereof. Although in the depicted embodiment the groove 34 faces the main body 12, in other suitable embodiments only a portion or, alternatively, no portion of the groove 34 may face the main body 12. In some embodiments groove 50 may be provided more inboard than is depicted in FIG. 15 such that, e.g., only a portion or, alternatively, no portion of the groove 50 faces the main body 12. In embodiments of the backing ring 10*n*, groove 50 may be engaged by an insertion and/or removal tool during installation and/or removal of the insertable ring 14*h*.

Figure 16:
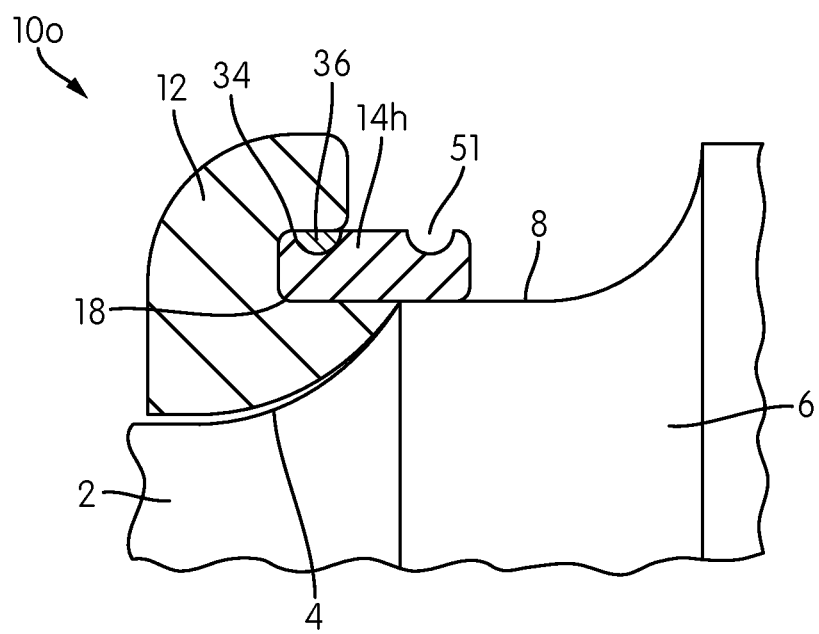

FIG. 16 depicts yet another embodiment of a two-part backing ring 10*o* according to aspects of the disclosure. The backing ring 10*o* depicted in FIG. 16 is similar to the backing ring 10*n* depicted in FIG. 15, including a groove 34 formed on an outer surface of the insertable ring 14*h* and another groove 51 provided inboard of groove 34, but in this embodiment a seal 36 is provided in the groove 34 of the insertable ring 14*h*. As discussed in connection with the other example seals provided herein, the seal 36 may help prevent water and other debris from entering the bearing assembly during use. The insertable ring 14*h* may also include a depression (e.g., a annular depression, an annular series of holes, an annular series of discrete depressions) for cooperation with an insertion and/or disassembly tool.

Figure 17:
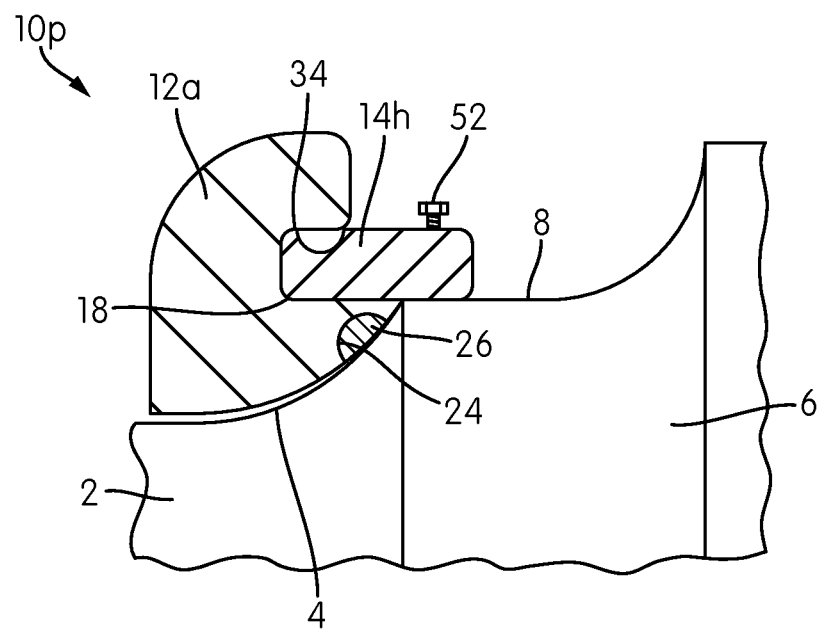

FIG. 17 depicts yet another embodiment of a two-part backing ring 10*p* according to aspects of the disclosure. The backing ring 10*p* depicted in FIG. 17 is similar to the backing ring 10*n* depicted in FIG. 15, but in this embodiment the backing ring 10*p* includes the main body 12*a* having the groove 24 and seal 26 and discussed more fully in connection with FIG. 3. Further, this embodiment includes one or more projections 52 from ring 14*h* which may include a bolt, cylinder, square, rectangle, ring, and/or other projection that may cooperate with an insertion and/or removal tool.

Figure 18:
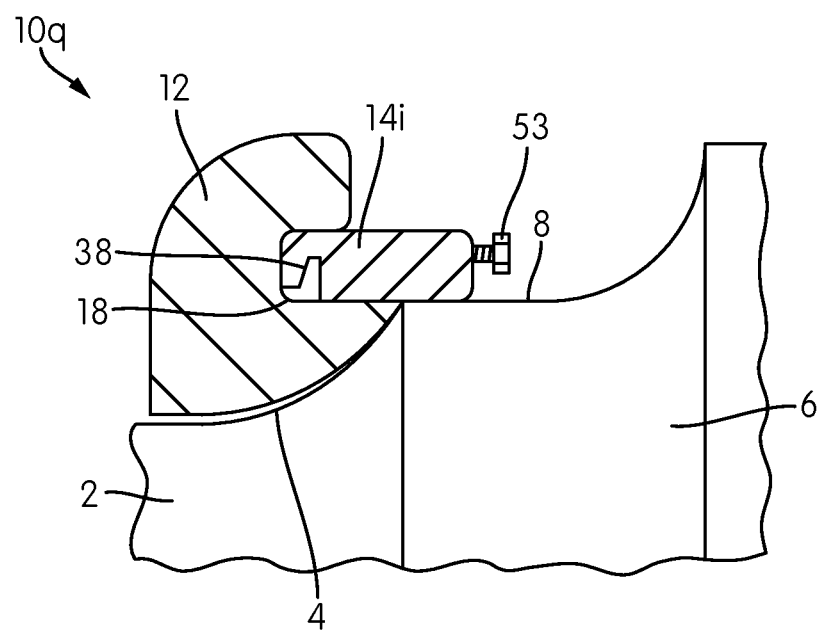

FIG. 18 depicts yet another embodiment of a two-part backing ring 10*q* according to aspects of the disclosure. The backing ring 10*q* depicted in FIG. 18 is similar to the backing ring 10b depicted in FIG. 4, but in this embodiment the backing ring 10q includes an insertable ring 14i including a tooth 38 provided at an outboard end of the insertable ring 14i. The tooth 38 may be engageable with a corresponding tooth of an insertion and/or removal tool to assist with installing and/or removing the insertable ring 14i from a railcar axle. Further, in some embodiments the insertable ring 14i may have a plurality of teeth (similar to tooth 38) spaced around the circumference of the insertable ring 14i. A series of lateral projections 53 may be used to rotate the ring 14i to engage or disengage the teeth in order to remove and/or insert the ring 14i. And as should be well appreciated given the benefit of this disclosure, in other embodiments the insertable ring 14i may be used with the main body 12a including the groove 24 and seal 26, and/or the insertable ring 14i may be provided with the groove 20 with or without the seal 22 provided therein without departing from the scope of this disclosure.

Figure 19:
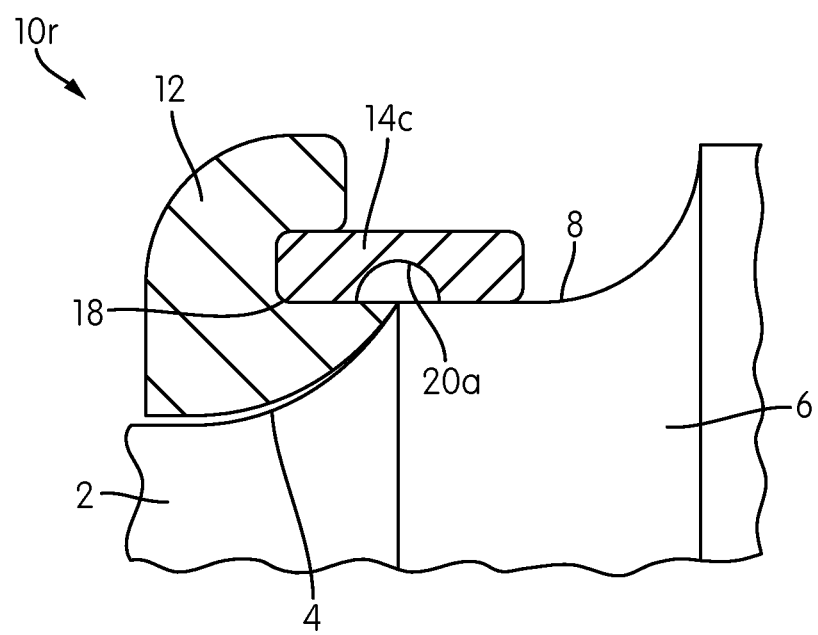

Finally, FIG. 19 depicts yet another embodiment of a two-part backing ring 10r according to aspects of the disclosure. The backing ring 10r depicted in FIG. 18 is similar to the backing ring 10b depicted in FIG. 6, but in this embodiment a groove 20a is provided on an inner face of the ring 14c and spaces the receiving element 18 of the main body and the cylindrical surface 8 of the shoulder 6.

The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and their practical application to enable one skilled in the art to utilize the present invention in various embodiments and with various modifications as are suited to the particular use contemplated. The features of the embodiments described herein may be combined in all possible combinations of methods, apparatuses, modules, systems, and machine-readable storage memory. Any and all permutations of features from the above-described embodiments are within the scope of the invention.

I claim:

1. A backing ring assembly comprising:
   a main body including an inner surface configured to abut a fillet of a railcar axle and a receiving element on an inboard axial face; and
   a ring engaged in the receiving element and configured to protrude over a cylindrical surface of a shoulder on the railcar axle, the shoulder being positioned inboard of the fillet,
   wherein the ring includes an inner face having an empty recess, a flat outer face, and a laterally extending flange on an inboard face of the ring.

2. A backing ring assembly comprising:
   a main body including an inner surface configured to abut a fillet of a railcar axle and a receiving element on an inboard axial face;
   a ring engaged in the receiving element and configured to protrude over a cylindrical surface of a shoulder on the railcar axle, the shoulder being positioned inboard of the fillet,
   wherein the ring includes an inner face having a recess, a flat outer face, and a laterally extending flange on an inboard face of the ring, and
   wherein, when the backing ring assembly is installed on the railcar axle, an inboard-most portion of the main body projects over the fillet of the railcar axle without extending over the cylindrical surface of the shoulder.

3. The backing ring assembly of claim 1, wherein an inboard-most portion of the main body below the receiving element projects further inboard than an inboard-most portion of the main body above the receiving element.

4. The backing ring assembly of claim 1, wherein the ring engages in the receiving element of the main body in an interference fit.

5. The backing ring assembly of claim 1, wherein the laterally extending flange includes one or more overhangs and/or depressions.

6. A railcar axle assembly comprising:
   a roller bearing assembly including a journal having a fillet on an outer surface and a shoulder inboard of the journal, the shoulder including an outer cylindrical surface, wherein the fillet abuts the cylindrical surface; and
   a backing ring abutting the fillet of the journal, the backing ring including:
      a main body having an inner surface abutting the fillet of the journal and a receiving element on an inboard axial face; and
      an insertable ring engaged in the receiving element and extending over the cylindrical surface of the shoulder, the insertable ring including an inner face having an empty recess, a flat outer face, and a laterally extending flange on an inboard face of the insertable ring.

7. A railcar axle assembly comprising:
   a roller bearing assembly including a journal having a fillet on an outer surface and a shoulder inboard of the journal, the shoulder including an outer cylindrical surface, wherein the fillet abuts the cylindrical surface;
   a backing ring abutting the fillet of the journal, the backing ring including:
      a main body having an inner surface abutting the fillet of the journal and a receiving element on an inboard axial face;
      an insertable ring engaged in the receiving element and extending over the cylindrical surface of the shoulder, the insertable ring including an inner face having a recess, a flat outer face, and a laterally extending flange on an inboard face of the insertable ring, and
   wherein an inboard-most portion of the main body projects over the fillet without extending over the cylindrical surface of the shoulder.

8. The railcar axle assembly of claim 6, wherein an inboard-most portion of the main body below the receiving element projects further inboard than an inboard-most portion of the main body above the receiving element.

9. The railcar axle assembly of claim 6, wherein the insertable ring engages the receiving element of the main body and the cylindrical surface of the shoulder in an interference fit.

10. The railcar axle assembly of claim 6, wherein the laterally extending flange includes one or more overhangs and/or depressions.

11. A backing ring assembly comprising:
    an annular main body configured to abut a fillet of a railcar axle, the annular main body including a receiving element on an inboard axial face; and
    a ring having an outboard end engaged in the receiving element, an inboard end configured to project over a cylindrical surface of a shoulder of the railcar axle, an inner face having a recess, an outer face without an empty recess, and a laterally extending flange on an inboard face of the ring.

12. A backing ring assembly comprising:
an annular main body configured to abut a fillet of a railcar axle, the annular main body including a receiving element on an inboard axial face;
a ring having an outboard end engaged in the receiving element, an inboard end configured to project over a cylindrical surface of a shoulder of the railcar axle, an inner face having a recess, an outer face without a recess, and a laterally extending flange on an inboard face of the ring, and
wherein, when the backing ring assembly is installed on the railcar axle, an inboard-most portion of the annular main body projects over the fillet of the railcar axle without extending over the cylindrical surface of the shoulder.

13. The backing ring assembly of claim 11, wherein an inboard-most portion of the annular main body below the receiving element projects further inboard than an inboard-most portion of the annular main body above the receiving element.

14. The backing ring assembly of claim 11, wherein the ring includes one or more projections extending from an inboard portion of the ring.

15. The backing ring assembly of claim 11, wherein the laterally extending flange includes one or more overhangs and/or depressions.

* * * * *